CONTROL APPARATUS FOR RECORD FEEDING DEVICES

Filed Oct. 22, 1959 2 Sheets-Sheet 1

INVENTOR
THOMAS W. THOMPSON

BY Donald F Voss

ATTORNEY

May 9, 1961 T. W. THOMPSON 2,983,356

CONTROL APPARATUS FOR RECORD FEEDING DEVICES

Filed Oct. 22, 1959 2 Sheets-Sheet 2

United States Patent Office 2,983,356

Patented May 9, 1961

2,983,356

CONTROL APPARATUS FOR RECORD FEEDING DEVICES

Thomas W. Thompson, Endwell, N.Y., assignor to International Business Machines Corporation, New York, N.Y., a corporation of New York Filed Oct. 22, 1959, Ser. No. 847,937

10 Claims. (Cl. 197—133)

Figure 1:
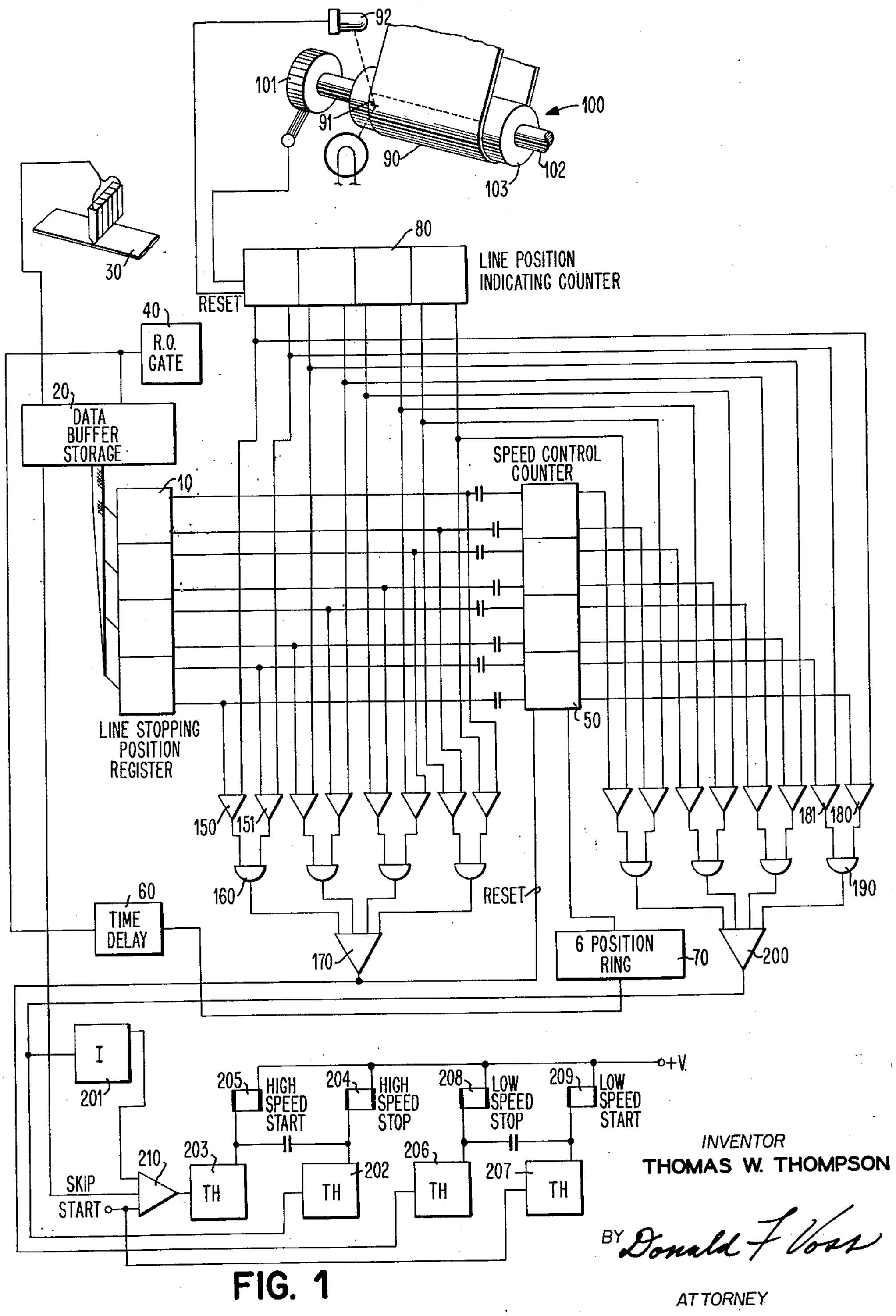

This invention relates to control apparatus for record feeding devices and, more particularly, to control apparatus for controlling the line skipping operation of record feeding devices.

Record feeding devices for feeding records, such as continuous forms, in printing machines usually have the facility to skip the form from one line space to another predetermined line space. The distance that the form will be skipped may be large or small; and, depending upon whether this distance is large or small, it has been found to be desirable to skip the form at high or slow speeds. Further, because of the harmful effects of stopping the record feeding means at high speeds, it is desirable to bring the record feeding apparatus into slow speed prior to stopping of the mechanism.

The switchover from high speed to slow speed may occur at a predetermined number of line spaces away from the stopping position. Of course, the new stopping position may be so close to the start position that the record feeding device will never start out in high speed, but will start out in slow speed and continue in slow speed until arrival at the stop position.

Heretofore, in relatively high-speed record feeding devices, it was customary to control the line skipping mechanism by means of a control tape. Tape controlled feed devices of the kind shown in the Mills et al. Patent No. 2,531,885, issued on November 28, 1950, have been improved upon, as evidenced by the patents to Reitfort, Patent No. 2,672,287; Bakelaar et al., Patent No. 2,684,746; and Cunningham et al., Patent No. 2,747,717. The present invention is an improvement over these tape controlled record feeding devices.

In the present invention, the control tape has been eliminated and provision is made to control the record feeding device in a manner that the same will start out in high speed if the new stopping position is more than a predetermined number of line spaces away from the old stopping position; otherwise, the record feeding device will start out in slow speed. If the record feeding device starts out in high speed, it will continue in high speed until the record being fed comes within a predetermined number of line spaces away from the stopping position. At this predetermined position, the mechanism for feeding the record will be switched from high speed to slow speed and continue in slow speed until the stop position is reached.

In the present invention, the new line stopping position is indicated by coded data contained in a register. This new line stopping position data may come from the input data source to the mechanism for printing upon the record being fed. For instance, the information to be printed upon the record may be contained on magnetic tape. Hence, this information would be accompanied by line indicating information which would be read and stored while a preceding printing operation is taking place. The new line position data is entered in a register and also in a first or speed control counter, which may be set either directly from the input data source or from the register which also contains this information.

A second or line position indicating counter contains coded data for indicating the present line position of the record. This coded data in the second counter is continuously compared against the information in the first counter and the information in the register. However, for any one operation, the information in the first counter does not remain constant as it does in the register. After the first counter has been set to contain the coded data representing the new line stopping position and while the immediate printing operation is taking place, a predetermined number of serial impulses are fed into the first counter to subtract from the value presently therein. During the time that the impulses are serially inserted into the first counter, the information therein is continuously compared against the data of the second counter. If the value of the first counter ever becomes equal to the value of the second counter as the predetermined number of impulses are inserted into the first counter to subtract from the value therein, a signal will be generated. This signal is a slow signal and will be stored in a latch so that, when a start signal is given by the printer, the record feeding device will start out in slow speed. The absence of obtaining a comparison between the first and second counters, as the predetermined number of impulses is applied serially to subtract from the value in the first counter, is an indication that, upon receiving a start signal from the printer, the record feeding device is to start out in high speed. By this arrangement, the new stop position is tested to ascertain how far away it is from the record position to determine the starting speed of the record feeding device.

If the record feeding device is to start out in high speed, it will continue in high speed until the record is within the predetermined number of line spaces away from the stopping position. Of course, this is determined by coincidence between the first and second counters. The second counter is advanced position by position for each line the record advances by action of the record feeding device. A commutator fixed to the platen shaft of the record feeding device, or other similar arrangement, impulses the second counter to advance the same position by position as the record advances line by line. The record feeding device shifts into slow speed upon comparison between the first and second counters and continues in this speed until there is a comparison between the second counter and the register indicating that the record has now arrived at the new stop position. Hence, the speed of the record feeding device is controlled by comparing the progressive line position of the record with the new stop position minus a predetermined number of line positions.

Accordingly, it is a principal object of the invention to provide an improved control over record feeding devices.

Another very important object of the invention is to provide apparatus for dynamically testing the new stop position prior to starting the record feeding device to see if the new stop position is within a predetermined number of positions away from the present record position to determine the starting speed of the record feeding device.

Also, another very important object of the invention is to provide apparatus for controlling the speed of record feeding devices by comparing the progressive record position with the new stopping position minus a predetermined number of line space positions.

A more specific object of the invention is to provide controls for record feeding apparatus which eliminate the need for a control tape.

Still another object of the invention is to provide controls for record feeding devices where the controls provide extremely flexible operation for both speed control and line stopping.

The foregoing and other objects, features and advantages of the invention will be apparent from the following more particular description of a preferred embodiment of the invention, as illustrated in the accompanying drawings.

Figure 2:
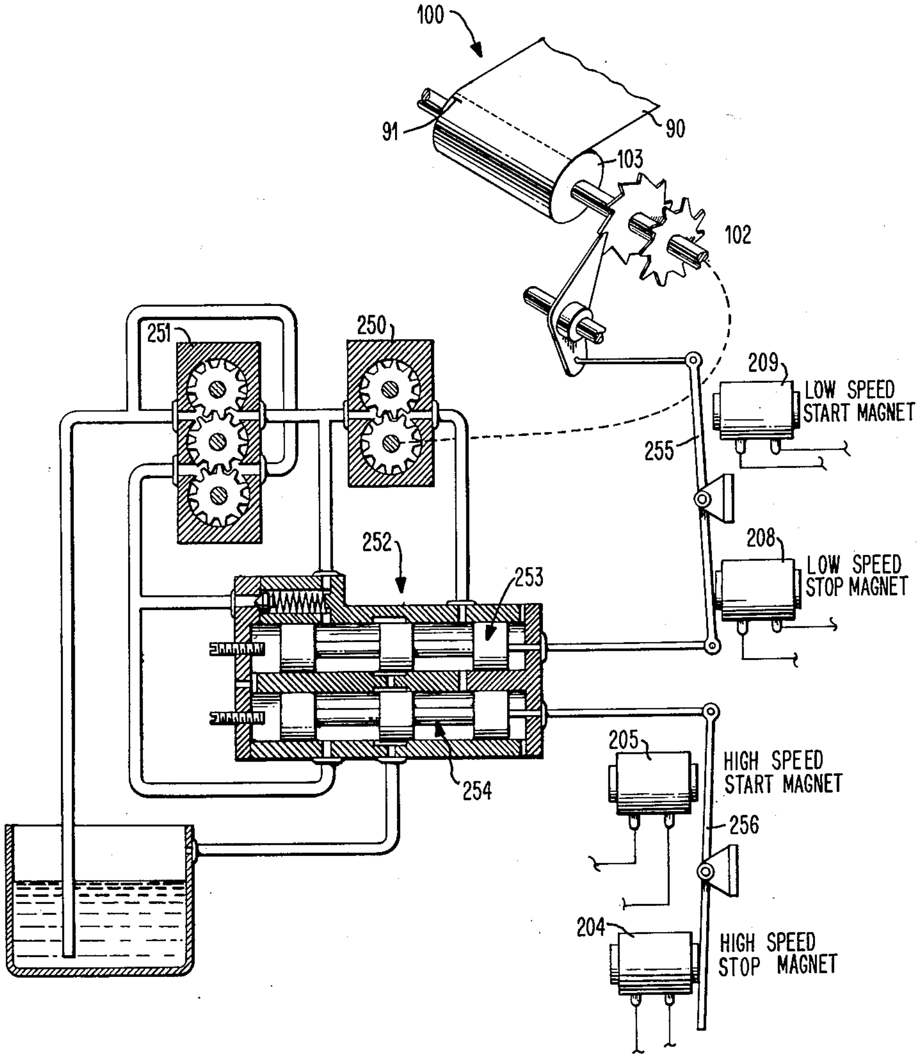

In the drawings:

Fig. 1 is a schematic diagram of the control circuitry for the record feeding device; and Fig. 2 is a schematic diagram of the drive arrangement for the record feeding device and the controls therefor.

Referring to the drawings, the invention is illustrated, by way of example, in Fig. 1 as a register 10 for containing coded data indicating the new line stopping position. The register 10 is set from data contained in a data buffer storage unit 20 which receives the data from a magnetic tape or other like record. A magnetic tape 30 contains the information which is to be printed upon the record, as well as the line on which the information is to be printed. The line indicating information held in the data buffer storage unit 20 is permitted to be entered into the register 10 under the control of a readout gate 40.

The register 10 is a binary type of register having bipolar outputs which are capacitively coupled to a speed control binary counter 50. Hence, when the register 10 is set with the information from the data storage unit 20, the speed control counter 50 also will be set with the same data. The readout gate 40 comes up during print time and remains up for a sufficient period of time to permit the setting of the register 10. The readout gate is also connected to a time delay unit 60 which controls the starting of a 6-position ring 70 connected to serially enter impulses into the counter 50. The time delay 60 permits the setting of the counter 50 with the same information contained in the register 10 prior to the entry of the serial impulses from the 6-position ring 70. The binary counter 50 is of the subtractive type so that the serial entry of impulses from the 6-position ring subtracts from the value set in the counter. Binary subtractive counters are well known in the art and a suitable one is described in the application of D. Apgar, Serial No. 703,-790, filed December 19, 1957.

For both starting speed and speed change purposes, the positions of the speed control counter 50 are compared with the positions of a line position indicating counter 80. The line position indicating counter 80 is also of the binary type and additive in operation. The line position indicating counter 80 indicates the line position of a record 90 being fed by a record feeding device 100. The line position indicating counter 80 is reset from a mark 91 contained on the record 90. This mark 91 is sensed by conventional photosensing means 92 which, upon sensing the mark, develops an impulse to reset the counter 80. The line position indicating counter 80 is advanced for each line space on the record as the record 90 is advanced by the record feeding device 100.

A commutator 101 for generating electrical impulses is fixed to the shaft 102 of the record feeding device 100. The commutator 101 has as many segments as there are line spaces to the form 90. The commutator 101 is connected to advance the line position indicating counter 80. Hence, when the record 90 is at line position one relative to the print mechanism, not shown, for printing upon the record, the line position indicating counter 80 will also register a "one"; and, as the record 90 is advanced line position by line position, the counter 80 will correspondingly be advanced. The bipolar outputs from each position of the line position indicating counter 80 are compared with the corresponding outputs from each position of the line stopping position register 10 and the speed control counter 50. For comparison purposes, the binary 1 output line of the first position of the register 10 is connected as one input to a logical AND circuit 150 having another input from the binary 1 output of the first position of the counter 80. The output of the logical AND circuit is connected to a logical OR circuit 160 having its output connected as an input to a logical AND circuit 170. The binary 0 output of the first position of the register 10 is connected as an input to a logical AND circuit 151 while the binary 0 output from the first position of the counter 80 is also connected as an input to the logical AND circuit 151. The output of the logical AND circuit 151 is connected as an input to the logical OR circuit 160. By similar logical AND and OR circuits, the remaining positions of the register 10 are compared with the remaining positions of the counter 80. There will be an output from the logical AND circuit 170 only if all the positions of the register 10 compare with all the positions of the counter 80.

A similar arrangement is utilized to compare the positions of the counter 80 with the positions of the counter 50. The binary 1 output of the first position of the counter 50 is connected as an input to a logical AND circuit 180 also having an input from the binary 1 output of the first position of the counter 80. The output of the logical AND circuit 180 is connected as an input to a logical OR circuit 190 having its output connected as an input to a logical AND circuit 200. The binary 0 output of the first position of the counter 50 is connected as an input to a logical AND circuit 181 also having an input connected to the binary 0 output of the first position of the counter 80. The output of the logical AND circuit 181 is connected as an input to the logical OR circuit 190. Similarly, the remaining positions of the counter 50 are compared with the remaining positions of the counter 80. There will be an output from the logical AND circuit 200 only if all of the positions of the counter 50 compare with the positions of the counter 80. An output from the logical AND circuit 200 is an indication that the record feeding device 100 is to operate in slow speed while an output from the logical AND circuit 170 is an indication that the record feeding device 100 is to stop.

The output from the logical AND circuit 200 is connected to the input or grid of an inverter 201 and to the input or grid of a thyratron 202 having its plate capacitively coupled to the plate of a thyratron 203. By capacitively coupling the plate of the thyratron 202 with the plate of the thyratron 203, the thyratron 203 will be held nonconductive when the thyratron 202 is conducting and the thyratron 202 will be held nonconductive when the thyratron 203 is conducting. The thyratron 202 controls the energization of a high-speed stop magnet 204 which is connected in its plate circuit. The thyratron 203 controls the energization of a high-speed start magnet 205 connected in the plate circuit of the thyratron 203.

The output of the logical AND circuit 170 is connected to the reset terminal for the counter 50 and to the input or grid of a thyratron 206. The thyratron 206 has its plate capacitively coupled to the plate of a thyratron 207. The grid or input of the thyratron 207 is connected to receive a start signal from the printer indicating that the record feeding device 100 may be started. The thyratron 206 controls a slow-speed stop magnet 208 while the thyratron 207 controls a slow-speed start magnet 209. The slow-speed stop and start magnets 208 and 209 are respectively connected in the plate circuits of the thyratrons 206 and 207. The start signal coming from the printer is also applied to a logical AND circuit 210 which has additional inputs from the inverter 201 and from the data buffer storage 20, indicating that a skip operation is to take place. The output of the logical AND circuit 210 is connected to the grid or input of the thyratron 203.

The magnets 204, 205, 208 and 209 control the operation of the record feeding device 100. The record feeding device 100 is schematically shown in Fig. 2 as a platen 103 mounted on the shaft 102. The platen 103 forms a part of a carriage mechanism, not shown, for feeding the records 90, or the like, on which printing may take place. The shaft 102 is driven by a hydraulic motor 250 supplied with fluid under pressure from a fluid pressure generating means 251. The operation of the hydraulic motor 250 is under control of valve means 252 which controls the discharge of fluid from the hydraulic motor 250 and, to a certain extent, the fluid pressure generating means 251. The valve means 252 includes a pair of spool valves 253 and 254; the spool valve 253 is the slow-speed control valve, while spool valve 254 is the high-speed control valve. The slow-speed control valve 253 is operably controlled by the slow-speed start and stop magnets 209 and 208, respectively. An armature 255 pivotally mounted intermediate of its ends is associated with the slow-speed start and stop magnets 209 and 208 and is attached at one end to the end of the slow-speed valve 253. Similarly, the high-speed control valve 254 is under control of the high-speed start and stop magnets 205 and 204, respectively, which operate a pivotally mounted armature 256 having one of its ends attached to the high-speed control valve 254.

Because of the capacitively coupled thyratrons 206 and 207, when the slow-speed start magnet 209 is energized, the slow-speed stop magnet 208 is de-energized, and vice versa. Similarly, when the high-speed start magnet 205 is energized, the high-speed stop magnet is de-energized, and vice versa. With the slow-speed stop magnet 208 and the high-speed stop magnet 204 energized, the valves 253 and 254 are held over to the right whereby fluid from the fluid generating means 251 is permitted to bypass the hydraulic motor 250. Hence, the hydraulic motor 250 does not turn and the record feeding device 100 will be held in a stop position. With the slow-speed start magnet 209 and the high-speed stop magnet 204 energized, the valves 253 and 254 are held over to the left and right positions, respectively. Under these conditions, a portion of fluid under pressure is directed to the hydraulic motor 250 and a portion of fluid under pressure bypasses the hydraulic motor 250. The hydraulic motor 250 is thereby driven at slow speed and, in turn, drives the record feeding device 100 at slow speed. With the slow-speed start magnet 209 and high-speed start magnet 205 energized, the record feeding device 100 will operate at high speed because the valves 253 and 254 are both held over to the left and all of the fluid from the fluid generating means 251 is directed to the hydraulic motor 250 to turn the same at high speed. Hence, to switch from high to slow speed, it is only necessary to de-energize the high-speed start magnet 205, which may be accomplished by causing the thyratrons 202 to conduct and thereby extinguish the thyratron 203 to cause de-energization of the magnet 205. The particular details of the operation of the hydraulic motor 250 as the valves 253 and 254 are shifted are described in the patent to H. A. Panissidi, No. 2,880,838, dated April 7, 1959.

*Mode of operation*

In order to appreciate the present invention, several examples will be given to illustrate its operation. In the first example, assume that printing is taking place on line 7 of the form 90. This will mean that the line position indicating counter 80 will contain the value "7." Suppose that the new information is to be printed on line 15. Hence, the register 10 will contain the value "15" when the readout gate is operated during the printing of line 7 to permit the data in the buffer storage unit 20 to be entered into the register 10. With the value "15" entered into the register 10, the speed control counter 50 also will contain the value "15." The time delay 60 delays the readout gate to permit the setting of the speed control counter 50 with the value "15" and shortly thereafter starts the 6-position ring. Impulses from the 6-position ring are serially applied to the speed control counter 50. Hence, the values in the speed control counter 50 will be descending from "15" to "9." Since the value "9" in the speed control counter 50 does not equal the value "7" in the line position indicating counter 80, there will not be an output from the logical AND circuit 200. Of course, the value "15" in the register 10 does not equal the value "7" in the line position indicating counter 80 and, accordingly, there will not be any output from the logical AND circuit 170. Hence, when a start signal is received from the printer to start movement of the record feeding device 100, both the thyratrons 203 and 207 will be rendered conductive and the start magnets 205 and 209 will both be energized, respectively. With both the start magnets 205 and 209 energized, the magnets 204 and 208 will be de-energized and the record feeding device 100 will be operating at high speed. The record feeding device 100 will advance the record 90 at high speed and the commutator 101 will be generating impulses to advance the line position indicating counter 80 from "7" on upward. When the line position indicating counter 80 reaches "9," a comparison of counter 80 with the speed control counter 50 will be obtained and there will be an output from the logical AND circuit 200. This output will cause the thyratron 202 to become conductive and thereby energize the high-speed stop magnet 204. The slow-speed start magnet 209 will remain energized and, therefore, the record feeding device 100 will continue in slow speed. As the record feeding device 100 continues in slow speed, the commutator 101 will continue to advance the line position indicating counter 80; and, when the value therein equals "15," comparison will be obtained between the register 10 and the line position indicating counter 80. Accordingly, there will then be an output from the logical AND circuit 170 which will be applied to render the thyratron 206 conductive, thereby energizing stop magnet 208 to cause the stopping of the hydraulic motor 250 and the record feeding device 100. The output from the logical AND circuit 170 will also be applied to reset the speed control counter 50. In the example just considered, it was ascertained by means of the speed control counter 50 upon application of the six serially applied impulses that the new stopping position, as indicated in the register 10, was such a distance away from the line position being printed upon that the record feeding device should start out in high speed. When the record feeding device advanced the record, so that the same was within six spaces from the stopping position, controls were effected to drive the record feeding device at slow speed until the record 90 arrived at the stop position or line 15.

In the second example, assume that printing is taking place on line 7 of the record 90 and the next line of printing is to occur upon line 11. The line position indicating counter 80 will contain the value "7" while the register 10 will be set to contain the value "11"; this information for the register 10 having been derived from the data buffer storage unit 20. With the register 10 set to contain the value "11," the speed control counter 50 will also be set to contain the value "11." After the readout gate has come up and has been delayed by the delay unit 60, the 6-position ring 70 will be started to emit impulses serially. These impulses serially emitted from the 6-position ring 70 will be applied to the speed control counter 50 so as to subtract from the value therein. When the value in the speed control counter 50 reaches "7," in consequence of the impulses coming from the 6-position ring 70, there will be comparison between the value in the line position indicating counter 80 and the speed control counter 50. Hence, there will be an output from the logical AND circuit 200. This output will be applied to the thyratron 202, which is already conducting, and to the inverter 201. Therefore, when a start signal is received from the printer, the thyratron 202 will remain conductive because the conditions for the logical AND circuit 210 will not be satisfied in view of the presence of the slow signal or output from the logical AND circuit 200. Accordingly, there will not be an input to the thyratron 203 to render the same conductive. However, the start signal will cause the thyratron 207 to become conductive and thereby energize the slow-speed start magnet 209. Hence, the record feeding device 100 will start up in slow speed and continue in slow speed until the record 90 is presented at the stop position. As the record feeding device 100 starts in slow speed and advances the record 90, the commutator 101 will advance the line position indicating counter 80. When the value in the line position indicating counter 80 reaches "11," there will be comparison between the counter 80 and the register 10. Hence, there will be an output from the logical AND circuit 170 which will be applied to the input of the thyratron 206 to render the same conductive and thereby energize the slow-speed stop magnet 208 and thereby cause the hydraulic motor 250 to stop, which in turn arrests the operation of the record feeding device 100. The output from the logical AND circuit 170 will also be applied to reset the speed control counter 50.

From the above, it is seen that apparatus has been provided for dynamically testing the new stop position to see if the same is within a predetermined number of positions away from the present record position to determine the starting speed for the record feeding device. Further, it is seen that, if the record feeding device starts in high speed, it will continue in high speed until the record is advanced to be within a predetermined number of line spaces away from the new stopping position, at which time controls are effected to drive the record feeding device at slow speed. The record feeding device will then continue in slow speed until the record is brought to the new stop position. Hence, apparatus is provided for controlling the speed of the record feeding device by comparing the progressive record position with the new stopping position minus a predetermined number of line space positions.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for controlling a record feeding device comprising: a line stopping position register having a predetermined number of positions settable to indicate a line position; a speed control counter having a predetermined number of positions settable to indicate a line position; a line position indicating counter having a predetermined number of positions settable to indicate a line position; first comparing means for comparing the positions of said line position indicating counter with the positions of said register whereby, if equal comparison is obtained, a stop signal is generated; and second comparing means for comparing the positions of said line position indicating counter with the positions of said speed control counter whereby, if equal comparison is obtained, a slow signal is generated.

2. Apparatus of claim 1 further comprising: means for connecting the positions of said register with the positions of said speed control counter so that the positions of said speed control counter are set by the positions of said register.

3. Apparatus of claim 2 further comprising: means for serially entering a predetermined number of impulses into said speed control counter after the same has been set by said register so as to reduce the value represented by the positions of said speed control counter as set by said register.

4. Apparatus of claim 3 further comprising: means for advancing said line position indicating counter position by position as the record feeding device advances the record line by line.

5. Apparatus of claim 1 further comprising: means operable in response to said stop signal for resetting said speed control counter.

6. Apparatus of the type described comprising: record advancing means for feeding records in a predetermined number of increments at speeds determined by the amount the record is to be fed; first drive means operably connected to said record advancing means to drive the same in slow speed; second drive means operably connected to said record advancing means to drive the same at high speed; a line stopping position register having a predetermined number of positions settable to indicate a line position; a speed control counter having a predetermined number of positions settable to indicate a line position; a line position indicating counter having a predetermined number of positions settable to indicate a line position; first comparing means for comparing the positions of said line indicating counter with the positions of said register whereby, if equal comparison is obtained, a stop signal is generated; first circuit means for applying said stop signal to said first drive means to render the same inoperable; second comparing means for comparing the positions of said line position indicating counter with the positions of said speed control counter whereby, if equal comparison is obtained, a slow signal is generated; and second circuit means for applying said slow signal to said second drive means to render the same inoperable.

7. Apparatus according to claim 6 wherein said first and second drive means are connected to said record advancing means so that operation of only the first drive means effects operation of said record advancing means in slow speed and combined operation of both said first and second drive means effects operation of said record advancing means in high speed.

8. Apparatus according to claim 6 further comprising: a commutator driven in synchronism with said record advancing means to generate an impulse for each incremental advance of the records, and circuit means for applying the impulses generated by said commutator to said line position indicating counter to advance the same position by position.

9. Apparatus acocrding to claim 8 wherein the records fed by said record advancing means each include a sensible mark and further comprising: sensing means for sensing the marks upon the records being fed by said record advancing means to generate an impulse, and circuit means for applying the impulse generated by said sensing means to said line position indicating counter so as to reset the same.

10. Apparatus according to claim 9 further comprising: means operable prior to movement of said record advancing means for serially changing the setting of said speed control counter a predetermined number of times to provide a predetermined number of comparisons between said speed control counter and said line position indicating counter whereby the starting speed of said record advancing means depends upon the results of the comparisons.

References Cited in the file of this patent

UNITED STATES PATENTS

| | | |
|---|---|---|
| 2,790,528 | Teitler | Apr. 30, 1957 |
| 2,831,561 | Speh | Apr. 22, 1958 |